United States Patent [19]

Herter et al.

[11] Patent Number: 4,480,691
[45] Date of Patent: Nov. 6, 1984

[54] RECYCLED FATTY ACID CRUDE PETROLEUM RECOVERY PROCESS

[76] Inventors: George L. Herter, 929 Third Ave., NW., Waseca, Minn. 59093; Christian Herter, 1087 E. Third St., Apt. #5, Duluth, Minn. 55812

[21] Appl. No.: 427,134

[22] Filed: Sep. 29, 1982

[51] Int. Cl.³ .................................................. E21B 43/40
[52] U.S. Cl. ................................... 166/267; 166/307; 208/11 LE
[58] Field of Search .............. 166/266, 267, 271, 273, 166/274, 307; 208/11 LE

[56] References Cited

U.S. PATENT DOCUMENTS

| | | | |
|---|---|---|---|
| 2,877,848 | 3/1959 | Case | 166/274 X |
| 3,006,411 | 10/1961 | Holbrook | 166/273 |
| 3,135,326 | 6/1964 | Santee | 166/273 X |
| 3,137,345 | 6/1964 | Harvey | 166/274 |
| 3,373,809 | 3/1968 | Cooke, Jr. | 166/273 |
| 3,929,190 | 12/1975 | Chang et al. | 166/273 |
| 3,953,317 | 4/1976 | Myers | 208/11 LE |
| 4,037,656 | 7/1977 | Cooper | 166/274 X |
| 4,213,500 | 7/1980 | Cardenas et al. | 166/273 |
| 4,338,185 | 7/1982 | Noelle | 208/11 LE |
| 4,389,300 | 6/1983 | Mitchell | 208/11 LE |

FOREIGN PATENT DOCUMENTS

| | | | |
|---|---|---|---|
| 680576 | 2/1964 | Canada | 208/11 LE |
| 899230 | 5/1972 | Canada | 166/273 |
| 2090858 | 7/1982 | United Kingdom | 208/11 LE |

Primary Examiner—George A. Suchfield
Attorney, Agent, or Firm—Stephen D. Carver

[57] ABSTRACT

A method of recovering crude oil for subsequent processing. The method contemplates the step of exposing the source of crude oil such as a subterranean petroleum reservoir or a vessel or container of tar sands, kerogen or the like to aliphatic or carboxylic acid, preferably oleic acid, to produce a solvated crude oil mixture of reduced viscosity. This mixture is saponifyed by reacting it with a nucleophilic base, preferably a hydroxide of potassium or sodium, under pressure whereby to separate the solvated mixture into petroleum crude and an acid soap which migrates to an aqueous phase. The petroleum crude is separated from the aqueous soap through conventional techniques. Afterwards, a desaponification step contemplates recovery of the aliphatic or carboxylic acid for subsequent recycling in the previously mentioned exposing step. Reuse is facilitated by desaponifying aqueous soap within a high pressure containment vessel reacted with an acid suitable for donating a hydrated proton to the aqueous phase of the soap. This reconstituted acid is recycled for injection into the inputting step. Preferably carbonic acid is generated for the desaponifying step by injecting high pressure carbon dioxide within the containment vessel. By-products of the chemical reaction are separated and/or filtered as necessary to effectuate necessary purification sub-steps.

25 Claims, 3 Drawing Figures

RECYCLED FATTY ACID CRUDE PETROLEUM RECOVERY PROCESS

BACKGROUND OF THE INVENTION

The present invention is generally concerned with the enhanced recovery of crude petroleum for subsequent refining, distillation or the like. More particularly, the present invention is concerned with a chemical method which broadly employs fatty acids for extracting petroleum by reducing its viscosity, but which further contemplates the recycling of the fatty acid reactant.

As will be immediately recognized by those skilled in the petroleum arts, the broad science of secondary recovery has long contemplated the further extraction of petroleum crude from "dry" wells by the injection of various solvents, high pressure steam, or other chemicals. A variety of prior art attempts have been proposed for secondary recovery. A typical example includes the drilling of a plurality of radially spaced apart secondary shafts surrounding the primary well, into which high pressure steam is injected to force out petroleum residue.

The term oil shale refers to a hard carbonaceous rock that can produce oil when heated to pyrolysis temperatures of approximately 800° to 1000° F. Petroleum is recovered when the shale is properly subjected to a suitable solvent. The oil precursor in such rock is a high molecular weight organic polymer called Kerogen.

Kerogen obtained from the upper regions of the Colorado and Utah oil shales has an average composition, by-weight, as follows: Carbon (80.5%); Hydrogen (10.3%); Nitrogen (2.4%); Sulpher (1%); Oxygen (5.8%). The host rock may consist mainly of Dolomite, Calcite, Quartz and other clays. The oil shale area of most significance in the United States is the Green river formation of Colorado, Utah and Wyoming. While a small percentage of this oil shale may be mined by surface techniques, most of it will be recovered through underground mining in large room-and-pillar mines.

Major emphasis has recently been directed to both underground mining and above ground retorting of minerals and oil shale. A variety of heat treating processes have been developed and reported in the prior art for developing and recovering suitable petroleum extracts from both tar sands, kerogen, and subterranean "dry" wells.

In the prior art it is well known to subject such petroleum bearing formations, wells or the like, to an organic solvent such as a fatty acid. Such an acid tends to reduce the viscosity of the captured petroleum, facilitating subsequent pumping. Fatty acids such as carboxylic long chain or aliphatic acids have been previously employed in the prior art. Moreover, such processes have been combined with the injection of high pressure steam to promote a subsequent aqueous reaction.

By using long chain carboxylic acids, productivity increases of as much as 50% or more have been obtained. The inherent economics of such a situation have yet to favor its large scale application, mainly as a result of the initial cost of the presently non-recycled fatty acids. Moreover, typical crude petroleum, once contaminated with the fatty acid in solution, cannot be purified by standard retorting, distilling or the like since the contaminating fatty acid will form an azeotrope with nearly every fraction of the desired petroleum oil. For this reason virtually every major oil refinery will refuse raw crude if substantially contaminated with fatty acid(s).

Formations of oil sands are usually shallow enough to allow for their removal by standard surface mining techinques. After the outcrop is suitably mined and the recovered petroleum bearing rock transported to a processing (i.e. crushing) position, treatment of the recovered sands etc. within an agitation tank may proceed by subsequent mixture with a fatty acid in aqueous solution. Agitation or heat may be additionally applied to lower the viscosity of the resulting solvated oil depending upon the temperature at which extraction is carried out. Silica and other minerals yielded in this manner may be separated by gravity through use of a centrifuge or the like. Electrolytes such as sodium cloride or potassium cloride have been added previously to sharpen this separation process. However it would seem desirable to initially separate the bitumen in the very first step to enhance the efficiency of a secondary oil recovery system. Moreover, due to the costs of the extraction solvents, some form of system for providing continuous recirculation and recycling of same is mandated.

In the prior art the use of heavy aliphatic hydrocarbon acids and the like, including oleic acid and its derivatives, is known in secondary oil recovery. Moreover saponification reactions have previously occurred in conjunction with crude oil recovery systems as a byproduct between the basic substances employed. Separation by the step of precipitation is also well known. U.S. Pat. No. 3,075,918 teaches the use of carbon dioxide in conjunction with the secondary recovery of hydro-carbon fuels. Specifically, it has been suggested to employ carbon dioxide in combination with the odixes of alkaline earth metals, the reaction yielding carbonates thereof. Kennedy U.S. Pat. No. 2,164,459 teaches secondary recovery in which oil and fatty acids or other emulsifying agents are employed. The latter reference points out the use of oleic compounds, and discusses the concept of saponification. U.S. Pat. No. 2,233,382 teaches a great deal of useful background information concerning the use of relatively high molecular weight acids in the secondary petroleum recovery arts. The latter patent, while it suggests the natural occurrence of soap-like derivatives as a result of the reaction of alkaline substances, is primarily directed towards the use of esters and related compounds in secondary recovery. U.S. Pat. No. 4,224,138 is directed to the recovery of tar sand subsequently subjected to a recovery process. The latter reference teaches the use of chemicals such as sodium hydroxide and/or other monoalkaline reagents for the removal of bitumen prior to separation of the slurry. U.S. Pat. No. 4,172,025 teaches the use of caustic soda to provide a slurry reaction. Other less relevant art known to us includes U.S. Pat. Nos. 3,392,105; 4,133,381; 2,342,106; 4,172,025 and 4,116,809.

SUMMARY OF THE INVENTION

The present invention provides a method for recovering crude oil for subsequent refining, which system contemplates a saponification-desaponification cycle for consistantly recycling and purifying the higher order hydro-carbon acid employed to dissolve the petroleum for subsequent refining and recovery.

Preferably the present invention includes the initial exposure of a higher order aliphatic or carboxylic acid to a source of raw crude oil. This may be done by pumping such an acid deeply into a subterranean petroleum reservoir, either through the primary well or through adjacent secondary flooding shafts. This may be done along with the pumping of water or steam. Moreover, such an acid may be exposed in a suitable reaction containment vessel to tar sands, kerogen, oil shale or the like, providing same has been properly crushed and processed along conventional lines for subsequent reaction.

Preferably the acid is agitated with respect to the crude oil source, whether it be the depths of a subterranean well or an upper containment vessel. This produces a solvated crude oil mixture with reduced viscosity, suitable for pumping and subsequent chemical reaction and separation.

The latter mixture is saponifyed by reacting same with a nucleophilic base under pressure whereby to separate the solvated mixture into petroleum crude and an acid soap which migrates to an aqueous phase because of the presence of water. Subsequently the petroleum crude is separated from the aqueous soap, and the aqueous soap is subjected to a desaponification reaction.

The latter reaction contemplates the high pressure exposure of the soap product to a reactive acid suitable for donating a hydrated proton within a containment vessel to reconstitute the aliphatic or carboxylic acid. In other words, in the desaponification step, the aqueous soap residue will be reconstituted in the form of the original aliphatic or carboxylic acid. This product may be recycled into the initial exposure step, saving the producer substantial sums otherwise expended in replacing the initial acidic reagent.

Various by-products of the reactive system are separated through conventional processes at pertinent times. For example, Silica or other sand products including drilling fragments etc. may be separated out through filtering when the initial slurry, for example, is extracted or pumped from the well. In the saponification stage, a process of conventional settling allows water to be drained off and recycled, and heavy-weight petroleum tar may be withdrawn for shipment to the refinery. In the reverse saponifications an aqueous carbonate salt is produced, along with the hydrocarbon acid. Hydrocarbon acid dissociates from water, and hence is separated in this fashion. Conventional evaporating tanks may be employed to separate metallic or salt byproducts from water, which are then returned to the well or otherwise recycled as desired.

Thus a broad object of the present invention is to provide a highly efficient and economical system for chemically recovering and processing crude oil from subterranean wells, tar sands, kerogen or oil shale deposits and the like.

Another object of the present invention is to conserve the diluting or emulsifying acid initially employed in secondary recovery systems.

Yet another object of the present invention is to provide a system for recovering the surfactant in its original form, suitable for subsequent recycling in continual use.

Yet another object of the present invention is to provide a secondary petroleum oil recovery processing system of the character described which may be employed in conjunction with surface formations, mined or drilled oil sand, subterranean reservoirs, or strip mined kerogen or tar sand regions.

A basic object of the present invention is to provide an extremely efficient fatty acid solvent extraction process, the inherent economics of which render the system financially worthwhile.

Another object of the present invention is to provide a petroleum recovery system employing fatty acids, which system will eliminate the conventional cost and contamination difficulties hitherto associated with their use.

More particularly, a basic object of the present invention is to provide a system for enhancing the capabilities of fatty acids, but which eliminates much of the hitherto prohibitive costs and contamination difficulties previously associated with their use in petroleum recovery.

These and other objects of the present invention, along with features of novelty appurtenant thereto, will appear or become apparent in the course of the following descriptive sections:

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE DRAWINGS

Figure 1:
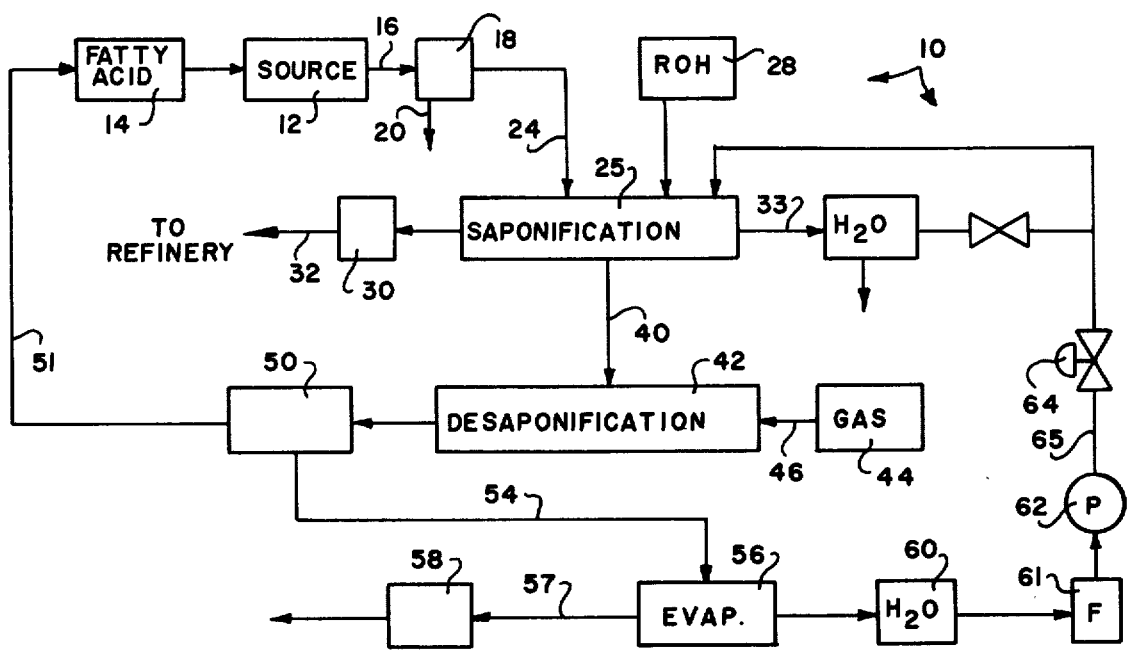
FIG. 1 is a basic, generalized flow diagram illustrating the process of the present invention.

With initial reference now to FIG. 1 of the drawings, the basic system 10 contemplated by the present invention broadly contemplates a source of raw petroleum 12. This source 12 may be a subterranean well, an above ground crude oil retort, a tar sand deposit, or a kerogen containment vessel or the like. A source of fatty acid, generally designated by the reference numeral 14, is employed to subject or expose raw petroleum or the like within source 12 for subsequent solvation and consequent viscosity reduction. As used herein, the term "fatty acid" shall be taken to mean a straight chain or branched hydrocarbon comprised of not less than 5 carbon atoms, and characterised by at least one carboxylic moiety such as may be generally referred to as higher aliphatic or carboxylic acids. A general formula for the acids contemplated in the initial step is:

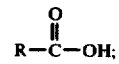

where "R" represents a substituted or or unsubstituted aliphatic group.

The particular fatty acid may be forced into a belowground formation through a conventional aboveground pumping station in a matter best suited to the particular strata. A plug of water, steam, gas or the like may follow to force the acid through the reservoir formation. Adsorbtion to matrix material around and within the lower subterranean reservoir will be reduced by the acid. The amount of acid required will depend primarily upon the permeability of the formation to water, and the viscosity of the crude petroleum to be diluted. If a given formation is highly permeable to water, less oil will be able to move through it, and hence such a formation will produce below its potential. However, the addition of a fatty acid will increase the permeability of the formation.

In the case of bitumen sands, standard mining techniques are usually sufficient because of their shallowness. Above ground treatment with a fatty acid may take place in source 12 in a conventional containment vessel. Mixture may occur for example, in a conventional agitation tank, although agitation must not be extremely hard and vigorous.

Thus a solvated mixture of fatty acid and dissolved petroleum will be received from source 12 via pipe 16 for agitation and/or settling within a suitable vessel 18. Silica, sand or other mineral solids may be filtered and removed via typical conveyor 20. The solution of fatty acid and crude petroleum will be transmitted to another high pressure containment vessel 25 through line 24.

The first stage in the separation process contemplated by the present invention involves a saponification step wherein the solvated mixture incoming to containment vessel 25 through line 24 is reacted with nucleophilic base under pressure whereby to produce a solution including petroleum crude and a fatty acid soap which migrates to an aqueous phase. This occurs when a strong base from the container 28 is inputted to vessel 25. Mild agitation increases the extent of the emulsification of the petroleum by-product. The resulting fatty acid soap selectively migrates to the aqueous phase, leaving behind the petroleum.

Thus a conventional phase separator 30 may be employed to output the recovered crude along line 32. Waste water may be outputted along line 33. Fatty acid soaps are transmitted via line 40 to a high pressure containment vessel 42 in which desaponification occurs by subjecting the aqueous fatty soap to a suitable acid. Preferably, the acid is formed from its gaseous derivative through a source 44 interconnected with vessel 42 via a valved conduit 46. For example, where reactor 42 is to subject the aqueous fatty acid soaps to desaponification through reaction with carbonic acid, high pressure carbon dioxide is applied through line 46.

The acids suitable for desaponification will be discussed in detail hereinafter. However, such an acid basically must be sufficient to donate a hydrated proton within vessel 42 to the fatty acid soap solution whereby to reconstitute the fatty acid, allowing it to be separated within conventional phase separator 50 and returned to the original fatty acid vessel 14 via line 51. Various by-products including precipitates, electolytes, and salts are recovered via line 54, and subjected to the conventional evaporation tank 56 for the outputting of solid metals via line 57 into hopper 58 and the possible recovery of water within condenser 60 which may be returned through filter 61 and pump 62 via line 65 and valve 64 back to saponification vessel 25.

Suitable fatty acids include caproic, caprylic, capric lauric, myristic, palmitic, stearic, arachidic, behinic, and lignoceric. The aforementioned alkanoic acids may be derived from natural products, and are hence even-numbered in carbon atoms (a consequence of the acetyl grouping). It should also be noted that homologues thereof having odd numbers of carbon atoms would also function, since the property for which they are chosen does not depend upon whether or not there are n carbon atoms or (2n−1) carbon atoms.

Mono and Poly alkanoic acids from 3 to 25 carbons in length may be used, although extreme branching in unsaturation will reduce the melting points. Hydro alkanoic acids may also be used, but since they have high melting points, use at standard temperature and pressure will be difficult. For example, hydroxybutanoics melts at 50° C. Alkanedioics has even higher melting points; Melonic melts at 135° C. Alkanoics such as Oleic acid, Petroseladic acid (which is the trans isomer of oleic acid) as well as most other octedecenoic acids are liquid at room temperature and hence are suggested. Linoleic acid, Trienoic acids such as alpha-linoleic acid, and gamma-linoleic acid are also suggested. Tetranoic acid works at relatively high temperatures.

Addition of a hydrolalic acid (HX) will result in bimolecular nucleophilic substitution (with inversion of configuration, although stereochemical considerations are not important in this particular reaction sequence):

RCHOHCH₂OH + HX = RCHXCH₂OH + RCHOHCH₂X
                          major
                          product Derivatives of the aforementioned fatty acids would be acceptable. Such derivatives, for example, may be employed by substitution of an electron withdrawing or electro-negative moiety. Such derivatives could include halogens, amine derivatives, hydroxyl and alkoxy derivatives, keto derivatives, aldehyde moieties and carbonate derivatives. As used herein, the term "derivative" shall refer to the latter substitution products. Derivatives may be synthesized by the reduction of the carboxyl terminus to an alcohol group with a powerful reducing agent such as an aluminum lithium hydride, followed by acid catalyzed dehydration:

Any nucleophilic derivative of the above substituents can be used to add these groups at the beta position. For example RCHOHCH₂OH + NaNH₂ = RCHNH₂CH₂OH +
               sodamide    major
                          product

RCHOHCH₂NH₂

Addition of potassium permanganate ($KMnO_4$) in aqueous solution will oxidize the primary alcohol back to a carboxyl function.

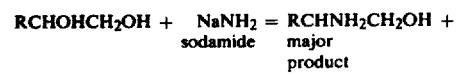

Where beta-halogens are involved, care must be taken to prevent an excess of acid to develop in solution, which could result in an elimination reaction, reforming the terminal alkene.

Amine derivatives would react similarly,

Tests using oleic acid have proven the validity of the proposed process. This material has the advantage of being inexpensive and readily available. The oleates formed during saponification are stable, nontoxic, and easily handled and transported. Unsaturation at Δ9 could decrease the stability of this molecule, especially during pressurized treatment with carbonic acid. The result could be addition to either C9 or C10 of an alcohol moiety, or cleavage at C9 forming octanoic acid and octanedioic acid (both of which are also good extractants). Saturated fatty acids greater than four carbons in length can also be used, and may endure more cycles through the process than unsaturated homologues.

Substitution of the fatty acid may be helpful in weakening its acidic carboxyl function, if the substitution is carried out adjacent to or within 5 to 10 carbon lengths of the terminal carboxy moiety. Within a weakened fatty acid, i.e., one to which an acid proton will bind more rigorously, recovery of the fatty acid from an aqueous solution of its conjugate base will require less concentrated solutions of Lowry-Bronsted acids. In the case of the carbon dioxide-carbonic acid system, this would reduce the pressure of $CO_2$ needed to bring about conversion in a given time interval.

Substituents capable of exerting an effect on the acidity of a fatty acid as described above must be of the electron donating or "soft" type. Examples are:
Alkyl side chains; branched and straight chain
Nitroso
Nitrate
Carbonate
Aryl
Benzyl
Primary or Secondary Alkynyl
Primary Alkenyl
Sulfites
Sulfates
Phosphates, Phosphites
Pyrophosphates
Thiosulfates
Nitriles
Aldehydes
—$COCH_3$
Esters In addition to making the fatty acid much easier to desaponify, these substituents, when attached at the aforementioned positions, will cause initial removal of the acid proton to become more difficult. If a strong base, such as sodium hydroxide or potassium hydroxide, is used in the saponification procedure, then the effect should not hinder the process.

A second group of fatty acid substituents may be introduced to increase the acidity of the carboxyl hydrogen, and hence, allow the use of weaker, less expensive bases for saponification separation. Such substituents would be of the electron withdrawing or "electronegative" variety, and, as with the soft functions, must be attached within 5 to 10 carbons of the primary carboxyl moiety, and preferably adjacent to it. They act to lessen the electron density of basic oxygen, and therefore relax the powerful bond between this oxygen and its acidic proton. The result is a stronger acid, which will undergo saponification more readily than an unsubstituted homologue. Examples of substituents capable of increasing the acid strength of a fatty acid include:
Halogens
Amines (—$NH_2$, NRH, —$NR_2$)
—SH
—OR
—OH
—$NHCOCH_3$
—$CCl_3$ Addition of the correct substituent could allow use of Calcium Carbonate or lime (the world's least expensive base) to achieve saponification, further reducing long term operating costs.

The saponification step preferably includes the use of a low cost base, such as calcium oxide (lime) potassium hydroxide, or sodium hyroxide. Rapid saponification of unsubstituted, mono substituted fatty acid derivatives of the type previously specified occurs when treated with a "strong" base such as sodium and/or potassium hydroxides; ammonia or alkoxide, salts; hydrides; and soluable sulphides. Stoichiometric considerations during saponification are critical. The amount of fatty acid contained in the extracted sample of petroleum must be known with substantial precision to ensure that the proper amount of base is added. If excess base is inadvertantly added, quantities of untreated fatty acid will be retained in the oil as a contaminant.

With regard to saponification unsubstituted fatty acids such as 18: $1^{\Delta 9}$ require the use of fairly powerful nucleophilic bases in order for saponification to occur spontaneously. Such bases include:
Sodium Hydroxide
Potassium Hydroxide
Ammonia (anhydrous or in concentrated aqueous solution)
Sodium, potassium methoxide (or any salt containing methoxide)
Sodium, potassium ethoxide (or any salt containing ethoxide)
Group 1a Hydrides
Tertiary Amines ($NR_3$)
Secondary Amines ($H_2H$)
Primary Amines ($NH_2R$)
Sodium Amide
Potassium Amide
Hydrazine
Piperidine Substitution of more electronegative functions in the vacinity of the alpha carbon allow use of the following bases:
Calcium Carbonate
Sodium Carbonate
Sodium Bicarbonate
Calcium Oxide (lime)

It has been demonstrated that the addition of small amounts of heat quickens the penetration of fatty acid into the petroleum. For application to existing wells, this poses no problem, since formation temperatures are usually quite high.

When free petroleum is presented for extraction, however, heat must be added to bring the temperature to between 30° and 100° C. The amount of heat needed is small enough to economically be created by burning small quantities of extracted petroleum. At this stage, no pressurization is required. Carbonic acid is a preferred saponification reagent. An important limitation arises concerning the physical chemistry of carbon dioxide. At certain temperatures and pressures this gas liquifies and no further compression can be accomplished. As reactor temperature increases, the "critical pressure", which represents the maximum allowable pressure, is pushed upward. However, it is important to keep in mind that as one increases the temperature, the maximum allowable pressure increases, but the solubility of carbonic acid could decrease. As is seen from studying the equation which describes solubility, it is the ratio of pressure to temperature which actually determines the amount of carbonic acid generated in aqueous solution. As can be seen from the following table, any combination of temperature and pressure conditions below or on the liquid-vapour equilibrium line and solid vapour line as seen on a plot of the following table can be used in the process described herein.

TABLE 1

| Log $P_{at}$ | $P_{atm}$ | Temp °C. | Temp K | P/T(atm K$^{-1}$) |
|---|---|---|---|---|
| 1.80 | 63.1 | 25 | 298 | 0.21 |
| 2.00 | 100.0 | 50 | 323 | 0.31 |
| 2.15 | 141.3 | 75 | 348 | 0.41 |
| 2.30 | 199.5 | 100 | 373 | 0.53 |
| 2.40 | 251.2 | 125 | 398 | 0.63 |
| 2.50 | 316.2 | 150 | 423 | 0.75 |
| 2.55 | 354.8 | 175 | 448 | 0.79 |
| 2.60 | 398.1 | 200 | 473 | 0.84 |
| 2.75 | 562.3 | 225 | 498 | 1.13 |
| 2.80 | 631.0 | 250 | 523 | 1.21 |
| 2.90 | 794.3 | 275 | 548 | 1.45 |
| 2.95 | 891.3 | 300 | 573 | 1.56 |

Desaponification occurs within vessel 42 when the aqueous soap solution arriving from conduit 40 is subjected to acid and water therewithin. Hydronium ions will be formed. Protonated solvent molecules will react with the soap to reconstitute the original fatty acid.

(i) 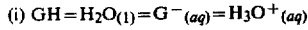 $GH = H_2O_{(l)} = G^-_{(aq)} + H_3O^+_{(aq)}$ (ii) 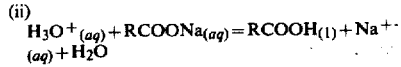
$H_3O^+_{(aq)} + RCOONa_{(aq)} = RCOOH_{(l)} + Na^+_{(aq)} + H_2O$ Above, "GH" represents a gas or other reagent which will react with the solvent in the prescribed manner to yield a hydrated proton, which, in turn, reacts with the aqueous soap, liberating the free fatty acid.

The driving force of equation (ii) is an equilibrium being made continually favorable to the right by the dissolution of fatty acid.

Substances capable of acting as "GH reagents" include:
Hydrohalic Acids
Hydrocyanic Acids
Hydrogen Peroxide (may produce destructive radicals)
Nitric Acid
Nitrous Acid
Sulfuric Acid
Sulfurous Acid
Phosphoric Acid
Phosphorous Acid
Acetic Acid
Formic Acid
Propionic Acid
Butyric Acid
Carbon Dioxide
Chlorous Acid
Chloric Acid
Hypochlorous Acid
Perchloric Acid
Perchlorous Acid
Other Strong Oxy Acids
Picric Acid
Ammonium compounds of the formula $(NH_4)_nX_n$, wherein N is an integer and X is an ion of the charge $-N$.

Although the cited chemicals include large families of reagents, carbon dioxide may be the least expensive to use on an industrial scale. Its reaction with water yields carbonic acid.

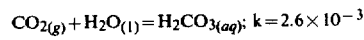
$CO_{2(g)} + H_2O_{(l)} = H_2CO_{3(aq)}; k = 2.6 \times 10^{-3}$

Carbonic Acid will then react with water to produce the hydrated proton:

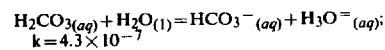
$H_2CO_{3(aq)} + H_2O_{(l)} = HCO_3^-_{(aq)} + H_3O^=_{(aq)};$
$k = 4.3 \times 10^{-7}$ This will react with the soap according to the reverse saponification relation. The concentration of carbonic acid depends upon the pressure of carbon dioxide (at constant temperature).

$$(H_2CO_3) = \left(\frac{P_{CO_2}}{RT}\right) K_{fH_2CO_3}$$

Whereby ( ) represents concentration in moles per liter, $K_{fH_2CO}$ is the equilibrium formation constant of carbonic acid from carbon dioxide and liquid water, R is the perfect gas constant, T is the absolute temperature, and $P_{CO_2}$ is the partial pressure of carbon dioxide in units which agree with R.

The above equation is valid and applies to all conditions at which carbon dioxide is in the vapour phase. Note that carbon dioxide may be added to the process in the liquid, or solid phase, or in any manner, including dissolving the gas in metals or other materials, which will produce the dissolved gas in aqueous solution, thereby generating carbonic acid.

Species which directly generate a proton by dissociation are added as the pure gas, liquid, or dissolved in aqueous or nonaqueous solution. Their reaction would be more direct. For example, hydrohalic acids react in two steps as follows:

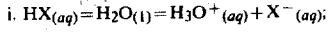
i. $HX_{(aq)} + H_2O_{(l)} = H_3O^+_{(aq)} + X^-_{(aq)};$

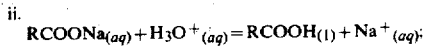
ii. $RCOONa_{(aq)} + H_3O^+_{(aq)} = RCOOH_{(l)} + Na^+_{(aq)}.$

After all chemical reactions have taken place, the excess proton yielding material is drained off to be used again, and the solution which now contains water, electrolytes, traces of unreacted soap, and free fatty acid, is passed through a phase separating device, allowing the fatty acid to be collected, but permitting the aqueous phase to flow through. The fatty acid is then recycled back to the oil field, in the case of reservoir applications, or back to the initial treatment tank in the case or mined or drilled tar sands.

EXAMPLE 1

Figure 2:
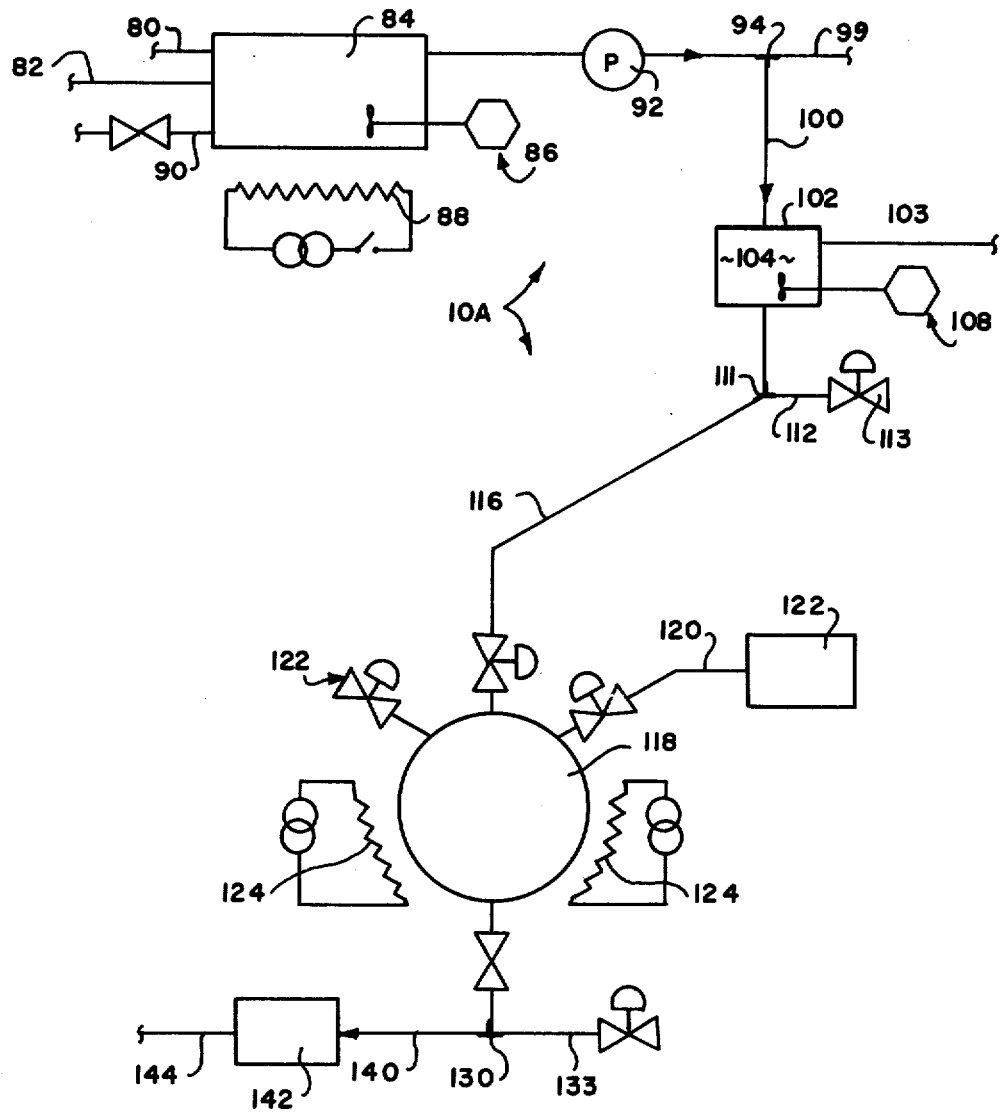
FIG. 2 is a fragmentary, pictorial, flow diagram illustrating one example of the present invention; and, FIG. 3 is a view similar to FIG. 2, illustrating an alternative example.

With reference now to FIG. 2 of the drawings, petroleum oleic acid mixtures enter the process 10A from pipe 80 and are combined with water from pipe 82 in settling tank 84. Agitation device 86 is then engaged, along with heating element 88. Any contaminating particles from the petroleum will be removed. Agitator 86 is then disengaged, allowing contaminants to settle to the bottom of vessel 84, being outputted through valved line 80. Mined oil sands can be directly added to vessel 84 after the majority of sediments have been separated, pump 92 moves the bisphasic mixture to phase separator 94. Water is then removed through pipe 99 to be recycled back to tank 84.

Petroleum and oleic acids flow through pipe 100 into saponification tank 102. A strong base, i.e. KOH or NaOH is injected via line 103. The mixture is gently agitated for a few minutes. Because this process is highly exothermic, some of the heat may be collected and returned to tank 84, i.e. tanks 102 and 84 should be mechanically disposed in heat exchange relation.

The saponified mixture is then moved to separator 111 in which it is passed over a teflon grid. The petroleum will stick and is collected through line 112 and valve 113. The saponified fatty acid flows over and through this grid, out pipe 116 and into pressure vessel 118 with pinvalve 122 open. Tank 118 must be constructed of molybdenum steel or some other alloy able to withstand internal pressures in excess of 1000 atmospheres.

Carbon dioxide is added through pipe 120 from source 122 at the desired pressure. Heat may then be added through coils 124 (or may be exchanged from tank 102). After a few minutes, valve 122 is opened, releasing the pressure inside tank 118. This is carbon dioxide gas, and can be collected for reuse, or released.

Inside phase separator 130 oleic acids are separated from the remaining aqueous solution over a spearator 111. The aqueous layer is removed through pipe 133 and may be recycled to tank 84. The oleic acid flows through return pipe 140. Drum drying at 142 may be required before it is sent back to the well site via return line 144.

EXAMPLE 2

Figure 3:
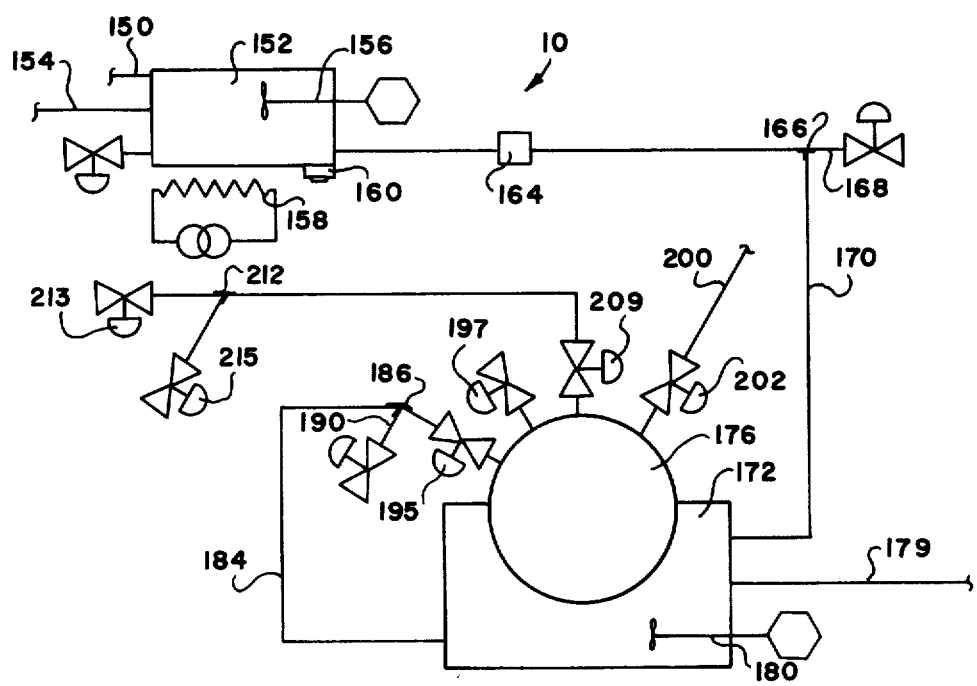

FIG. 3 represents a refinement of the same process illustrated in FIG. 2 with an emphasis on energy conservation.

Raw petroleum-oleic acid mixtures enter through pipe 150 to settling tank 152. Water is added through pipe 154. The mixture is then agitated by rotor 156. Heat may be added through coil 158. After a few minutes, agitation is stopped, and the phases are allowed to separate. At this point, all sedimentary contaminants will have settled to the bottom of tank 152 and may be disposed through cleaning port 160.

Fluid pump 164 then moves the combined phases into phase separator 166. Water is removed through pipe 168 to be reused in tank 152. Petroleum and oleic acids travel through pipe 170 into tank 172 which is constructed so as to surround tank 176.

An alkaline base is added through pipe 179 and gentle agitation is produced by apparatus 180. Sufficient heat should be generated to speed the process in tank 176.

After a few minutes, the contents of tank 172 are transferred via line 184 to phase separator 186. Phase separator 186 is a teflon grid separator. Petroleum is removed to the refinery through pipe 180.

The oleic acid flows through valve 195 into tank 176 with release valve 197 open. Carbon dioxide from a reservoir at the end of pipe 200 flows into tank 176. When the desired pressure has been established, valve 202 is closed and the mixture is allowed to react for several minutes. Small heat exchange fins may be attached to tank 176 such that they protrude into tank 172 to promote heat exchange. As before, tank 176 must be constructed so as to contain pressures at least as large as 1000 atmospheres.

When valve 209 is opened, pressures inside will force the contents of tank 176 into phase separator 212. The excess carbon dioxide can be recovered or released.

Separator 212 is designed such that the aqueous phase may be collected through valve 213 while the fatty acid is recovered through valve 215 to be recycled back to the petroleum well site.

EXAMPLE 3

The fatty acid is added to petroleum or oil sands in an amount which will sufficiently reduce the viscosity so as to simplify recovery. The amount added must be recorded with precision, since the following saponification step requires adherence to a stoichiometric relation:

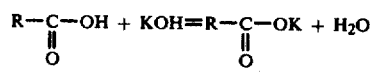

In this instance, the stoichiometric coefficients are unity for all involved species. The same is true of sodium hydroxide or ammonia when used as saponifying agents:

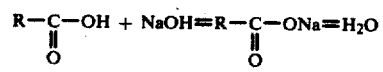

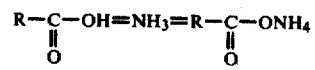

If a chlorinated fatty acid is used for viscosity reduction, less expensive bases, such as lime (calcium oxide) may be used:

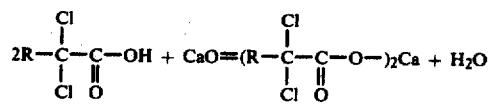

Although calcium soaps are generally not very water soluble, addition of the halogen moieties near the alpha terminus tend to reverse this because of their effect of changing the electronic distribution, and therefore, adding to the polarity of the molecule. In such case, the stoichiometry demands only half as much base per equivalent weight of fatty acid. The use of sodium carbonate would also produce this same relation:

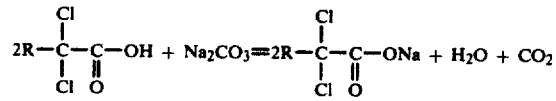

The third step of the process uses carbonic acid under pressure to recover the free fatty acid:

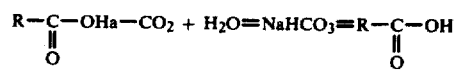

The stoichiometry would be the same for halogenated fatty acids.

From the foregoing, it will be seen that this invention is one well adapted to obtain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A method for recovering crude oil for subsequent refining, the method comprising the steps of:
   (a) exposing a fatty acid to a source of raw crude oil;
   (b) agitating said fatty acid with respect to or within the crude oil to produce a solvated crude oil mixture of reduced viscosity;
   (c) saponifying said solvated crude oil mixture of step (b) by reacting the same with a nucliophilic base under pressure to separate the solvated crude oil mixture into petroleum crude and a fatty acid soap which migrates to an aqueous phase;
   (d) separating said petroleum crude from said fatty acid soap of step (c);
   (e) desaponifying said fatty acid soap to recover said fatty acid for subsequent recycling and reuse in conjunction with step (a), said desaponification step including the steps of:
      (i) inputting said fatty acid soap in said aqueous phase into a high pressure containment vessel;
      (ii) reacting said fatty acid soap with an acid for donating a hydrated proton within said vessel to reconstitute the fatty acid used in step (a);
      (iii) separating the reconstituted fatty acid of step (ii); and,
      (iv) recycling the recovered fatty acid of step (iii); into step (a).

2. The method as claimed in claim 1 wherein said fatty acid is selected from the group consisting of caproic acid; caprylic acid; capric acid; lauric acid; myristic acid; palmitic acid; stearic acid; arachidic acid; behinic acid; lignoceric acid; mono and/or poly alkanoic acid; hydroxyalkanoic acid; alkenediolic acid; alkenoic acids linoleic acid; truenoic acids; and tetranoic acids.

3. The method as claimed in claim 2 where said last mentioned group includes acid derivatives thereof.

4. The method as claimed in claim 3 wherein said nucliophilic base is further selected from the group consisting of calcium carbonate, sodium carbonate, sodium bicarbonate, and calcium oxide.

5. The method as claimed in claim 2 wherein said alkanoic acids are selected from the group consisting of oleic acid, petroselaidic acid and octadecenoic acid.

6. The method as claimed in claim 2 wherein said truenoic acids are selected from the group consisting of alpha linoleic acid and gamma - linoleic acid.

7. The method as claimed in claim 2 wherein said tetranoic acids include aracadonic acid.

8. The method as claimed in claim 1 wherein said acid for donating a hydrated proton employed in conjunction with desponification step (e) is capable of producing a proton in aqueous solution to precipitate said acid from a solution of its conjugate base and is selected from the group consisting of nitric acid; nitrous acid; hydrohalic acids; hydrocyanic acids; hydrogen peroxide; sulfuric or sulfurous acid; phosphoric or phosphorous acid; acetic acid; formic acid; propionic acid; butyric acid; carbonic acid; chloric or chlorous acid; hyochlorous acid; perchloric acid; perchlorous acid; picric acid; an ammonium compound of the formula $(NH_4)_n X_n$, where n is an integer and X is an ion with a charge $-n$; carboxylic acid; phenol and its aryl substituted derivatives; and terminal alkynes.

9. The method as claimed in claim 8 wherein said fatty acid is selected from the group consisting of caproic acid; caprylic acid; capric acid; lauric acid; myristic acid; palmitic acid; stearic acid; arachidic acid; behinic acid; lignoceric acid; mono and/or poly alkanoic acid; hydroxyalkanoic acid; alkenediolic acid; alkenoic acids linoleic acid; truenoic acids and tetranoic acids.

10. The method as claimed in claim 9 wherein said alkanoic acids are selected from the group consisting of oleic acid, petroselaidic acid and octadecenoic acid.

11. The method as claimed in claim 9 wherein said truenoic acids are selected from the group consisting of alpha-linoleic acid and gamma-linoleic acid.

12. The method as claimed in claim 9 wherein said tetranoic acids include araodonic acid.

13. The method as claimed in claim 8 wherein said nucliophilic base employed in saponification step (c) is selected from the group consisting of sodium hydroxide; potassium hydroxide; ammonium hydroxide; potassium or sodium methoxide; potassium or sodium ethoxide; tertiary amines; primary or secondary amines; potassium or sodium amide; hydrazine; and piperdine.

14. The method as claimed in claim 13 wherein said fatty acid is selected from the group consisting of caproic acid; carylic acid; capric acid; lauric acid; myristic acid; palmitic acid; stearic acid; arachidic acid; behinic acid; lignoceric acid; mono and/or poly alkanoic acid; hydroxyalkanoic acid; alkenediolic acid; alkenoic acids; linoleic acid; truenoic acids and tetranoic acids.

15. The method as claimed in claim 14 where said last mentioned group includes acid derivatives thereof.

16. The method as claimed in claim 14 including the step of settling said solvated crude oil mixture of reduced viscosity after agitating step (b) but prior to saponifying step (c) to remove abrasive nonreactive particles therefrom.

17. The method as claimed in claim 16 wherein separating step (iii) includes the step of precipitating salts from the resulting solution of step (ii).

18. The method as claimed in claim 16 wherein said non-reactive particles are sand.

19. The method as claimed in claim 14 wherein said alkanoic acids are selected from the group consisting of oleic acid, petroselaidic acid and octadecenoic acid.

20. The method as claimed in claim 14 wherein said truenoic acids are selected from the group consisting of alpha-linoleic acid and gamma-linoleic acid.

21. The method as claimed in claim 14 wherein said tetranoic acids include aracadonic acid.

22. The method as claimed in claim 1 wherein said nucleophilic base employed in saponification step (c) is selected from the group consisting of sodium hydroxide; potassium hydroxide; ammonium hydroxide; potassium or sodium methoxide; potassium or sodium ethoxide; tertiary amines; primary or secondary amines; potassium or sodium amide; hydrazine; and piperidine.

23. The method as claimed in claim 1 wherein saponifying step (c) comprises the step of pressurizing said solvated crude oil mixture and water within a pressure vessel in the presence of carbon dioxide gas to generate carbonic acid.

24. The method as claimed in claim 23 wherein said pressurizing step is conducted at between 50 and 100 atmospheres, and a temperature between 10 and 200 degrees centigrade.

25. The method as claimed in claim 1 wherein said raw crude oil is selected from the group consisting of subterranean petroleum reserves, tar sands deposits, kerogen and oil shale.

* * * * *